(12) United States Patent
Kambe et al.

(10) Patent No.: US 6,471,930 B2
(45) Date of Patent: Oct. 29, 2002

(54) SILICON OXIDE PARTICLES

(75) Inventors: Nobuyuki Kambe, Menlo Park, CA (US); Xiangxin Bi, San Ramon, CA (US)

(73) Assignee: NanoGram Corporation, Fremont, CA (US)

( * ) Notice: Subject to any disclaimer, the term of this patent is extended or adjusted under 35 U.S.C. 154(b) by 0 days.

(21) Appl. No.: 09/731,286

(22) Filed: Dec. 6, 2000

(65) Prior Publication Data

US 2001/0000912 A1 May 10, 2001

Related U.S. Application Data

(62) Division of application No. 08/961,735, filed on Oct. 31, 1997, now Pat. No. 6,290,735.

(51) Int. Cl.[7] .................. C01B 33/12; C03C 3/06; B01J 21/08; B01J 20/10
(52) U.S. Cl. .............. 423/335; 423/337; 501/54; 502/232; 502/407
(58) Field of Search ................. 423/325, 335, 423/337; 501/53, 133, 154, 54; 502/232, 407; 252/79.1; 65/17.3, 17.4, 17.5

(56) References Cited

U.S. PATENT DOCUMENTS

| | | | |
|---|---|---|---|
| 3,406,228 A | 10/1968 | Hardy et al. | |
| 3,954,945 A | 5/1976 | Lange et al. | |
| 4,011,099 A | 3/1977 | Gutsche | |
| 4,034,130 A | * 7/1977 | Briska et al. | 427/248 C |
| 4,048,290 A | 9/1977 | Lee | |
| 4,356,107 A | 10/1982 | Payne | |
| 4,536,252 A | 8/1985 | McDonald et al. | |
| 4,548,798 A | 10/1985 | Rice | |
| 4,554,291 A | 11/1985 | Gupta et al. | |
| 4,556,416 A | 12/1985 | Kamijo et al. | |

(List continued on next page.)

FOREIGN PATENT DOCUMENTS

| WO | WO 95/24054 | 2/1995 |
|---|---|---|
| WO | WO 98/51613 | 5/1998 |

OTHER PUBLICATIONS

Richard J. Lewis, Sr. Hawley's Condensed Chemical Dictionary. Third Edition. John Wiley & Sons, Inc. Copy right @ 1997. p 944.*

Ullmanns Encyclopedia of Industrial Chemistry, vol. A. Alphabetically arranged articles. 23. Refractory Ceramics to Silicon Carbide—5., completely rev. ed. (1993).

Laser Synthesis of Vanadium–Titanium Oxide Catalysts, J. Mater. Res. vol. 7, No. 10 (Oct. 1992).

(List continued on next page.)

*Primary Examiner*—Stuart L. Hendrickson
*Assistant Examiner*—Cam N. Nguyen
(74) *Attorney, Agent, or Firm*—Patterson, Theunt, Skaar & Christensen, P.A.; Peter S. Dardi; David Kleinsmith (57) ABSTRACT

A method for the production of silicon oxide particles includes the pyrolysis of a molecular stream with a silicon compound precursor, an oxygen source and a radiation absorbing gas. The pyrolysis is driven by a light beam such as an infrared laser beam. The method can be used in the production of nanoscale particles including highly uniform nanoscale particles.

20 Claims, 3 Drawing Sheets

U.S. PATENT DOCUMENTS

| | | | |
|---|---|---|---|
| 4,558,017 A | | 12/1985 | Gupta et al. |
| 4,574,078 A | | 3/1986 | Cortesi et al. |
| 4,617,237 A | * | 10/1986 | Gupta et al. ............... 428/446 |
| 4,649,037 A | | 3/1987 | Marsh et al. |
| 4,687,753 A | | 8/1987 | Fiato et al. |
| 4,689,129 A | | 8/1987 | Knudsen |
| 4,705,762 A | | 11/1987 | Ota et al. |
| 4,764,497 A | | 8/1988 | Yuasa et al. |
| 4,775,520 A | | 10/1988 | Unger et al. |
| 4,808,397 A | | 2/1989 | Albizzati et al. |
| 4,842,832 A | | 6/1989 | Inoue et al. |
| 4,842,837 A | | 6/1989 | Shimizu et al. |
| 4,959,113 A | | 9/1990 | Roberts |
| 4,983,650 A | | 1/1991 | Sasaki |
| 4,995,893 A | * | 2/1991 | Jenkins et al. ............... 65/18.2 |
| 5,013,706 A | | 5/1991 | Schramm et al. |
| 5,014,646 A | * | 5/1991 | Ito et al. .................... 118/725 |
| 5,053,580 A | | 10/1991 | Schramm et al. |
| 5,062,936 A | | 11/1991 | Beaty et al. |
| 5,108,732 A | | 4/1992 | Krumbe et al. |
| 5,128,081 A | | 7/1992 | Siegel et al. |
| 5,169,610 A | | 12/1992 | Yamada et al. |
| 5,207,878 A | | 5/1993 | Shimo et al. |
| 5,228,886 A | | 7/1993 | Zipperian |
| 5,246,475 A | * | 9/1993 | Edagawa et al. ............ 65/18.2 |
| 5,352,277 A | | 10/1994 | Sasaki |
| 5,358,695 A | | 10/1994 | Helble et al. |
| 5,395,413 A | * | 3/1995 | Sempolinski et al. ......... 65/414 |
| 5,417,956 A | | 5/1995 | Moser |
| 5,447,708 A | | 9/1995 | Helble et al. |
| 5,480,696 A | | 1/1996 | Harris et al. |
| 5,527,423 A | | 6/1996 | Neville et al. |
| 5,580,655 A | | 12/1996 | El-Shall et al. |
| 5,599,511 A | | 2/1997 | Helble et al. |
| 5,626,715 A | | 5/1997 | Rostoker |
| 5,635,154 A | | 6/1997 | Arai et al. |
| 5,645,736 A | | 7/1997 | Allman |
| 5,650,017 A | | 7/1997 | Gordon et al. |
| 5,770,022 A | | 6/1998 | Chang et al. |
| 5,801,092 A | | 9/1998 | Ayers |
| 5,846,310 A | | 12/1998 | Noguchi et al. |
| 5,871,872 A | | 2/1999 | Matijevic et al. |
| 5,876,683 A | | 3/1999 | Glumac et al. |
| 5,891,205 A | | 4/1999 | Picardi et al. |
| 5,958,348 A | | 9/1999 | Bi et al. |
| 6,312,656 B1 | * | 11/2001 | Blackwell et al. .......... 423/337 |

OTHER PUBLICATIONS

Infrared Laser Generation of Heterogeneous Catalysts and Laser–induced Reactions at Catalytic Surfaces, SPIE vol. 458 Applications of Lasers to Industrial Chemistry (1984).

Sinterable Ceramic Powders from Laser–Driven Reactions: II, Powder Characteristics and Process Variables, Journal of the American Ceramic Society—Cannon et al., vol. 65, No. 7, (Jul., 1982).

Synthesis of Ultrafine $Si_3N_4$ Particles by $CO_2$–Laser Induced Gas Phase Reactions, High temperature Science, vol. 27 by the Humana Press Inc. (1990.

Synthesis of Ultrafine Ceramic Powders by Means of $CO_2$ Laser in a Flow Reactor, SPIE vol. 1279 Laser–Assisted Processing II )1990).

Sinterable Powders from Laser–Driven Reactions, John S. Haggerty and W. Roger Cannon, Laser–Induced Chemical Processes, Plenum Press, New York (1981).

Manufacturing Nanocrystalline Materials by Physical Vapor Synthesis, By Quinton Ford, Director of Marketing, Industrial Products, Nanophase Technologies Corp., Burr Ridge, I11.

Structure and Properties of Nanophase $TiO_2$, Journal De Physique, Colloque C5, Supplement au n°, Tome 49, Oct. (1988).

Laser Pyrolysis Techniques: Application to Catalysis, Combustion Diagnostics, and Kinetics, SPIE vol. 458 Applications of Lasers to Industrial Chemistry (1984).

Analytical Applications of Laser Powered Pyrolysis, R. L. Woodin and K. A. Kajkowski, SPIE vol. 458 Applications of Lasers to Industrial Chemistry (1984).

Laser–Driven Synthesis of Transitional Carbides, Sulfides, and Oxynitrides, Gary W. Rice, Laser Chemistry of Organometallics, (1993).

Synthesis, Characterization, and Properties of Nanophase $TiO_2$, J. Mater. Res. 3 (6), Nov./Dec. (1988).

Materials Reports—Research Opportunities on Clusters and Cluster–assembled Materials—A Department of energy, Council on Materials Science Panel Report; J. Mater. Res., vol. 4, No. 3, May/Jun. (1989).

Nanocrystalline $\alpha$–Fe, $Fe_3C$, and $Fe_7C_3$ Produced by $CO_2$ Laser Pyrolysis; J. Mater. Res., vol. 8, No. 7, Jul. (1993).

Material Synthesis by Laser Heating of Gases, Spectochimica Acts, vol. 43A. No. 2 pp. 299–300 (1987).

Synthesis of Ultrafine $TiO_2$ powders by a CW $CO_2$ Laser, Elsevier Science Publishers B.V. (North–Holland) (1990).

* cited by examiner

SILICON OXIDE PARTICLES

CROSS REFERENCE TO RELATED APPLICATIONS

This application claims priority to and is a divisional application of and commonly assigned U.S. patent application Ser. No. 08/961,735, filed Oct. 31, 1997, now U.S. Pat. No. 6,290,735, issued Sep. 18, 2001, entitled "Abrasive Particles For Surface Polishing," incorporated herein by reference.

FIELD OF THE INVENTION

The invention relates to abrasive compositions useful for surface polishing, especially mechanochemical polishing, and methods for producing abrasive particles.

BACKGROUND OF THE INVENTION

Technological advances have raised the demand for improved material processing with strict tolerances on processing parameters. In particular, smooth surfaces are required in a variety of applications in electronics, tool production and many other industries. The substrates requiring polishing can involve hard materials such as ceramics, glass and metal. As miniaturization continues even further, even more precise polishing will be required. Current submicron technology requires polishing accuracy on a nanometer scale. Precise polishing technology can employ mechanochemical polishing involving a polishing composition that acts by way of a chemical interaction of the substrate with the polishing agents as well as an abrasive effective for mechanical smoothing of the surface.

SUMMARY OF THE INVENTION

Improved polishing compositions are described for smoothing surfaces to very low tolerances. The polishing compositions are based on small particles with a very narrow distribution of particle diameters to provide for more control over the polishing process. Furthermore, a collection of preferred particles have effectively no particles with significantly larger diameters. In addition, the preferred particles have a very high level of purity with respect to a single crystalline phase. Laser pyrolysis provides for the production of preferred particles. Laser pyrolysis not only provides for the production of particles with preferred properties for abrasive applications but also for efficient and controlled production of the particles. These features provide for cost effective commercialization of the improved abrasive compositions.

In a first aspect, the invention features a composition comprising a dispersion of particles, the particles including metal compounds and having an average particle diameter from about 5 nm to about 200 nm and a distribution of diameters such that at least about 95 percent of the particles have a diameter greater than about 60 percent of the average diameter and less than about 140 percent of the average diameter. The particles can be dispersed in an aqueous or nonaqueous solution. The particles preferably comprise a composition selected from the group consisting of $SiO_2$, $SiC$, $TiO_2$, $Fe_3C$, $Fe_7C_3$, $Fe_2O_3$, $Fe_3O_4$, $MoS_2$, $MoO_2$, $WC$, $WO_3$ and $WS_2$. The particles preferably have an average diameter less than about 100 nm.

In another aspect, the invention features a composition comprising a dispersion of particles, the particles including metal compounds with an average particle diameter from about 5 nm to about 200 nm and a single crystalline phase with a uniformity of at least about 90 percent by weight. The particles can be dispersed in an aqueous or nonaqueous solution. The particles preferably have a single phase uniformity of at least about 95 percent by weight, more preferably at least about 99 percent by weight and even more preferably at least about 99.9 percent by weight.

In another aspect, the invention features a composition comprising a dispersion of particles, the particles including metal carbides or metal sulfides and having an average particle diameter from about 5 nm to about 200 nm.

In another aspect, the invention features a method of smoothing a surface comprising the step of polishing the surface with a composition of the invention, as summarized above and further described below. The polishing can be performed with a polishing pad and can involve a motorized polisher.

In another aspect, the invention features a method of producing $SiO_2$ particles including the step of pyrolyzing a molecular stream comprising a silicon compound precursor, an oxidizing agent and a radiation absorbing gas in a reaction chamber, where the pyrolysis is driven by heat absorbed from a laser beam. The silicon compound precursor can include a compound that is selected from the group consisting of $CH_3SiCl_3$. The laser beam preferably is supplied by a $CO_2$ laser. The molecular stream preferably is generated by a nozzle elongated in one dimension.

In another aspect, the invention features a method of producing iron oxide particles comprising the step of pyrolyzing a molecular stream comprising a iron compound precursor, an oxidizing agent and a radiation absorbing gas in a reaction chamber, where the pyrolysis is driven by heat absorbed from a laser beam. The iron precursor can comprise $Fe(CO)_5$.

Other features and advantages are evident from the detailed description of the invention and claims presented below.

DESCRIPTION OF THE PREFERRED EMBODIMENTS

Methods have been developed for producing nanoscale particles with a small distribution of particle diameters. These particles generally have a single crystalline phase and a high level of uniformity. These particles are useful as abrasives, especially for polishing hard surfaces that have restrictive tolerance requirements with respect to smoothness. The small diameters together with the narrow spread in distribution of diameters provide for polishing to generate a surface with reduced degree of surface roughness. The particles can be used in polishing compositions containing other polishing agents that supplement the abrasive properties of the particles alone. The polishing compositions can be used for manual polishing or for polishing with a motorized polisher.

Suitable abrasive particles generally are ceramics, although not necessarily electrical insulators, and can include a variety of metal oxides, sulfides and carbides as well as silica compounds. Preferred particles are relatively hard. The particle can include, for example, one of the following compounds: $SiO_2$, $SiC$, $TiO_2$, $Fe_2O_3$, $Fe_3O_4$, $Fe_3C$, $Fe_7C_3$, $MoS_2$, $MoO_2$, $WC$, $WO_3$, and $WS_2$. A mixture of abrasive particles of different chemical composition can be used to form a polishing formulation. The appropriate composition of the abrasive particles depends on the composition of the substrate to be polished.

Laser pyrolysis, as described below, is an excellent process for efficiently producing suitable ceramic particles with a narrow distribution of average particle diameters. A basic feature of successful application of laser pyrolysis for the production of appropriate small scale particles is production of a molecular stream containing a precursor compound, a radiation absorber and a reactant serving as an oxygen, sulfur or carbon source. The molecular stream is pyrolyzed by an intense laser beam. As the molecular stream leaves the laser beam, the particles are rapidly quenched.

Laser pyrolysis provides for formation of phases of metal compounds that may be difficult to form under thermodynamic equilibrium conditions. The particles produced by laser pyrolysis also are suitable for optional further processing to alter and/or improve the properties of the particles.

A. Particle Production

Laser pyrolysis has been discovered to be a valuable tool for the production of nanoscale silicon dioxide, silicon carbide and metal oxide, metal carbide and metal sulfide particles of interest. In addition, the particles produced by laser pyrolysis are a convenient material for further processing to expand the pathways for the production of desirable metal compound particles. Thus, using laser pyrolysis alone or in combination with additional processes, a wide variety of silicon dioxide, silicon carbide and metal oxide, metal carbide and metal sulfide particles can be produced. In some cases, alternative production pathways can be followed to produce comparable particles.

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Nevertheless, some general observations on the relationship between reaction conditions and the resulting particles can be made.

Increasing the laser power results in increased reaction temperatures in the reaction region as well as a faster quenching rate. A rapid quenching rate tends to favor production of high energy phases. Similarly, increasing the chamber pressure also tends to favor the production of higher energy structures. Also, increasing the concentration of the reactant serving as the oxygen, carbon or sulfur source in the reactant stream favors the production of metal oxides, metal carbides or metal sulfides with increased amounts of oxygen, carbon or sulfur.

Reactant gas flow rate and velocity of the reactant gas stream are inversely related to particle size so that increasing the reactant gas flow rate or velocity tends to result in smaller particle size. Also, the growth dynamics of the particles have a significant influence on the size of the resulting particles. In other words, different crystal forms of a product compound have a tendency to form different size particles from other crystal forms under relatively similar conditions. Laser power also influences particle size with increased laser power favoring larger particle formation for lower melting materials and smaller particle formation for higher melting materials.

Appropriate precursor compounds generally include metal or silicon compounds with reasonable vapor pressures, i.e., vapor pressures sufficient to get desired amounts of precursor vapor in the reactant stream. The vessel holding the precursor compounds can be heated to increase the vapor pressure of the metal (silicon) compound precursor, if desired. Preferred silicon precursors include, for example, $CH_3SiCl_3$. Preferred iron precursors include, for example, $Fe(CO)_5$.

Preferred reactants serving as oxygen sources include, for example, $O_2$, $CO$, $CO_2$, $O_3$ and mixtures thereof. Preferred reactants serving as carbon sources include, for example, $C_2H_4$ and $C_6H_6$. Preferred reactants serving as sulfur sources include, for example, $H_2S$. The reactant compound from the oxygen, carbon or sulfur source should not react significantly with the metal compound precursor prior to entering the reaction zone since this generally would result in the formation of large particles.

Laser pyrolysis can be performed with a variety of optical laser frequencies. Preferred lasers operate in the infrared portion of the electromagnetic spectrum. $CO_2$ lasers are particularly preferred sources of laser light. Infrared absorbers for inclusion in the molecular stream include, for example, $C_2H_4$, $NH_3$, $SF_6$, $SiH_4$ and $O_3$. $O_3$ can act as both an infrared absorber and as an oxygen source. Similarly, $C_2H_4$ can act as both a infrared absorber and as a carbon source. The radiation absorber, such as the infrared absorber, absorbs energy from the radiation beam and distributes the energy to the other reactants to drive the pyrolysis.

Preferably, the energy absorbed from the radiation beam increases the temperature at a tremendous rate, many times the rate that energy generally would be produced even by strongly exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction.

An inert shielding gas can be used to reduce the amount of reactant and product molecules contacting the reactant chamber components. Appropriate shielding gases include, for example, Ar, He and $N_2$.

The production of iron carbides by laser pyrolysis has been described in Bi et al., "Nanocrystalline α-Fe, $Fe_3C$, and $Fe_7C_3$ produced by $CO_2$ laser pyrolysis," J. Mater. Res. 8:1666–1674 (1993), incorporated herein by reference.

An appropriate laser pyrolysis apparatus generally includes a reaction chamber isolated from the ambient environment. A reactant inlet connected to a reactant supply system produces a molecular stream through the reaction chamber. A laser beam path intersects the molecular stream at a reaction zone. The molecular stream continues after the reaction zone to an outlet, where the molecular stream exits the reaction chamber and passes into a collection system. Generally, the laser is located external to the reaction chamber, and the laser beam enters the reaction chamber through an appropriate window.

Figure 1:
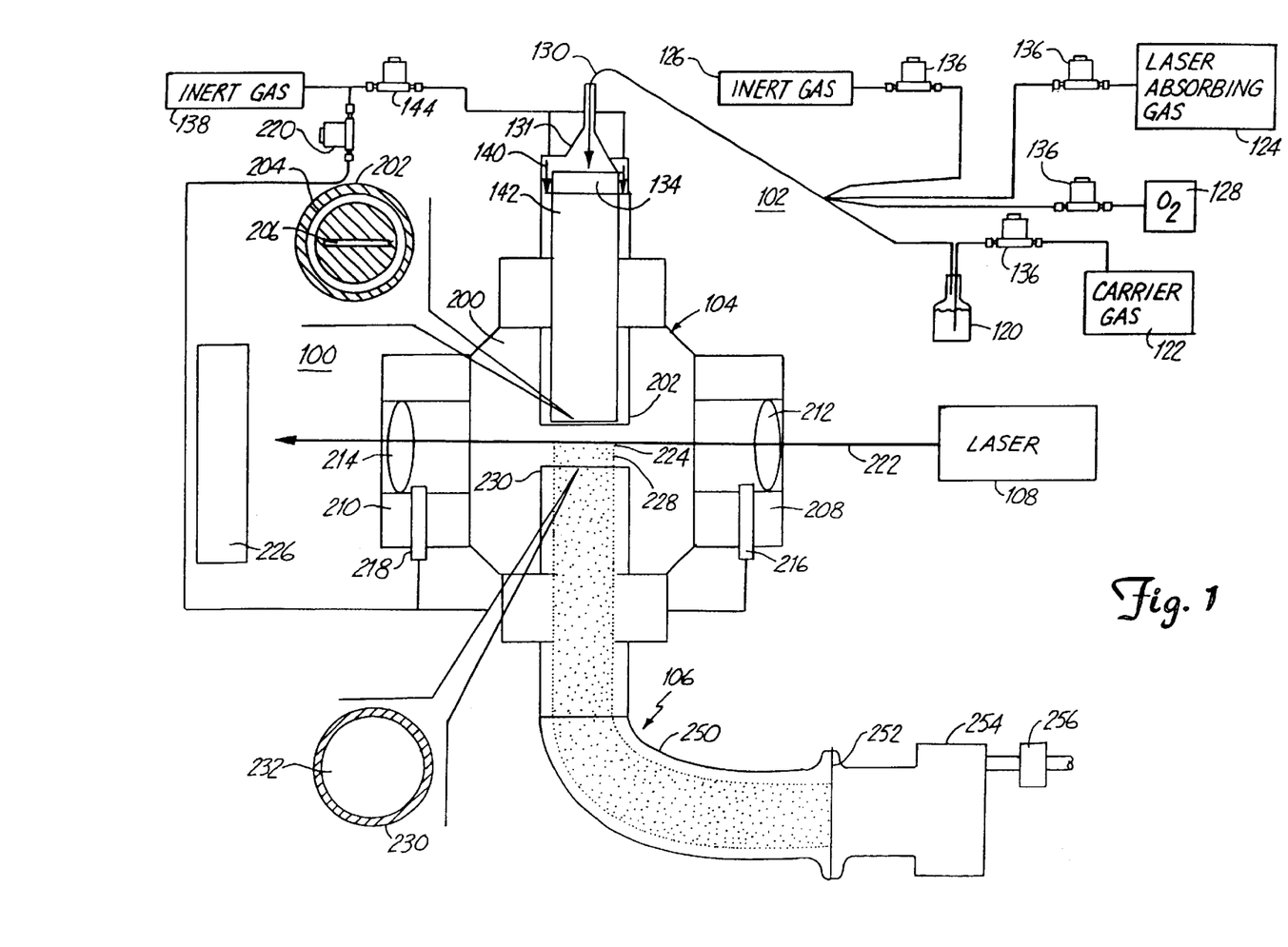
FIG. 1 is a schematic, sectional view of an embodiment of a laser pyrolysis apparatus taken through the middle of the laser radiation path. The upper insert is a bottom view of the injection nozzle, and the lower insert is a top view of the collection nozzle.

Referring to FIG. 1, a particular embodiment 100 of a pyrolysis apparatus involves a reactant supply system 102, reaction chamber 104, collection system 106 and laser 108. Reactant supply system 102 includes a source 120 of precursor compound. For liquid precursors, a carrier gas from carrier gas source 122 can be introduced into precursor source 120, containing liquid precursor to facilitate delivery of the precursor. The carrier gas from source 122 preferably is either an infrared absorber or an inert gas and is preferably bubbled through the liquid, precursor compound. The quantity of precursor vapor in the reaction zone is roughly proportional to the flow rate of the carrier gas.

Alternatively, carrier gas can be supplied directly from infrared absorber source 124 or inert gas source 126, as appropriate. The reactant providing the oxygen, carbon or sulfur is supplied from reactant source 128, which can be a gas cylinder or other suitable container. The gases from the precursor source 120 are mixed with gases from reactant source 128, infrared absorber source 124 and inert gas source 126 by combining the gases in a single portion of tubing 130. The gases are combined a sufficient distance from reaction chamber 104 such that the gases become well mixed prior to their entrance into reaction chamber 104. The combined gas in tube 130 passes through a duct 132 into rectangular channel 134, which forms part of an injection nozzle for directing reactants into the reaction chamber.

Flow from sources 122, 124, 126 and 128 are preferably independently controlled by mass flow controllers 136. Mass flow controllers 136 preferably provide a controlled flow rate from each respective source. Suitable mass flow controllers include, for example, Edwards Mass Flow Controller, Model 825 series, from Edwards High Vacuum International, Wilmington, Mass.

Inert gas source 138 is connected to an inert gas duct 140, which flows into annular channel 142. A mass flow controller 144 regulates the flow of inert gas into inert gas duct 140. Inert gas source 126 can also function as the inert gas source for duct 140, if desired.

The reaction chamber 104 includes a main chamber 200. Reactant supply system 102 connects to the main chamber 200 at injection nozzle 202. The end of injection nozzle 202 has an annular opening 204 for the passage of inert shielding gas, and a rectangular slit 206 for the passage of reactant gases to form a molecular stream in the reaction chamber. Annular opening 204 has, for example, a diameter of about 1.5 inches and a width along the radial direction of about 1/16 in. The flow of shielding gas through annular opening 204 helps to prevent the spread of the reactant gases and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably plane-focusing lenses with a focal length equal to the distance between the center of the chamber to the surface of the lens to focus the beam to a point just below the center of the nozzle opening. Windows 212, 214 preferably have an antireflective coating. Appropriate ZnSe lenses are available from Janos Technology, Townshend, VT. Tubular sections 208, 210 provide for the displacement of windows 212, 214 away from main chamber 200 such that windows 212, 214 are less likely to be contaminated by reactants or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the-flow of shielding gas into tubular sections 208, 210 to reduce the contamination of windows 212, 214. Tubular inlets 216, 218 are connected to inert gas source 138 or to a separate inert gas source. In either case, flow to inlets 216, 218 preferably is controlled by a mass flow controller 220.

Laser 108 is aligned to generate a laser beam 222 that enters window 212 and exits window 214. Windows 212, 214 define a laser light path through main chamber 200 intersecting the flow of reactants at reaction zone 224. After exiting window 214, laser beam 222 strikes power meter 226, which also acts as a beam dump. An appropriate power meter is available from Coherent Inc., Santa Clara, Calif. Laser 108 can be replaced with an intense conventional light source such as an arc lamp. Preferably, laser 108 is an infrared laser, especially a CW $CO_2$ laser such as an 1800 watt maximum power output laser available from PRC Corp., Landing, N.J. or a Coherent® model 525 (Coherent, Inc., Santa Clara, Calif.) with a maximum power output of 375 watts.

Reactants passing through slit 206 in injection nozzle 202 initiate a molecular stream. The molecular stream passes through reaction zone 224, where reaction involving the precursor compound takes place. Heating of the gases in reaction zone 224 is extremely rapid, roughly on the order of $10^{5\circ}$ C./sec depending on the specific conditions. The reaction is rapidly quenched upon leaving reaction zone 224, and particles 228 are formed in the molecular stream. The nonequilibrium nature of the process allows for the production of particles with a highly uniform size distribution and structural homogeneity.

The path of the molecular stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. Circular opening 232 feeds into collection system 106.

The chamber pressure is monitored with a pressure gauge attached to the main chamber. The preferred chamber pressure for the production of the desired oxides, sulfides and carbides generally ranges from about 80 Torr to about 500 Torr.

Reaction chamber 104 has two additional tubular sections not shown. One of the additional tubular sections projects into the plane of the sectional view in FIG. 1, and the second additional tubular section projects out of the plane of the sectional view in FIG. 1. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of particles.

Collection system 106 can include a curved channel 250 leading from collection nozzle 230. Because of the small size of the particles, the product particles follow the flow of the gas around curves. Collection system 106 includes a filter 252 within the gas flow to collect the product particles. A variety of materials such as teflon, glass fibers and the like can be used for the filter as long as the material is inert and has a fine enough mesh to trap the particles. Preferred materials for the filter include, for example, a glass fiber filter from ACE Glass Inc., Vineland, N.J.

Pump 254 is used to maintain collection system 106 at a selected pressure. A variety of different pumps can be used. Appropriate pumps for use as pump 254 include, for example, Busch Model B0024 pump from Busch, Inc., Virginia Beach, Va. with a pumping capacity of about 25 cubic feet per minute (cfm) and Leybold Model SV300 pump from Leybold Vacuum Products, Export, Pa. with a pumping capacity of about 195 cfm. It may be desirable to flow the exhaust of the pump through a scrubber 256 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the laser and monitors the pressure in the reaction chamber. The computer can be used to control the flow of reactants and/or the shielding gas. The pumping rate is controlled by either a manual needle valve or an automatic throttle valve inserted between pump 254 and filter 252. As the chamber pressure increases due to the accumulation of particles on filter 252, the manual valve or the throttle valve can be adjusted to maintain the pumping rate and the corresponding chamber pressure.

The reaction can be continued until sufficient particles are collected on filter 252 such that the pump can no longer maintain the desired pressure in the reaction chamber 104 against the resistance through filter 252. When the pressure in reaction chamber 104 can no longer be maintained at the desired value, the reaction is stopped, and the filter 252 is removed. With this embodiment, about 3–75 grams of particles can be collected in a single run before the chamber pressure can no longer be maintained. A single run generally can last from about 10 minutes to about 3 hours depending on the type of particle being produced and the particular filter. Therefore, it is straightforward to produce a macroscopic quantity of particles, i.e., a quantity visible with the naked eye.

The reaction conditions can be controlled relatively precisely. The mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the bottom of the reaction chamber, and the product particles are collected from the top of the chamber. This alternative configuration can result in a slightly higher collection of product for particles that are buoyant in the surrounding gases. In this configuration, it is preferable to include a curved section in the collection system so that the collection filter is not mounted directly above the reaction chamber.

An apparatus similar to laser pyrolysis embodiment 100 has been used to produce a variety of vanadium oxide nanoparticles in different oxidation states. These are described in commonly assigned U.S. patent application Ser. No. 081897,778, filed Jul. 21 1997 now U.S. Pat. No. 6,106,798, incorporated herein by reference.

An alternative design of a laser pyrolysis apparatus has been described. See, commonly assigned U.S. patent application Ser. No. 08/808,850, now U.S. Pat. No. 5,958,348 entitled "Efficient Production of Particles by Chemical Reaction," incorporated herein by reference. This alternative design is intended to facilitate production of commercial quantities of particles by laser pyrolysis. A variety of configurations are described for injecting the reactant materials into the reaction chamber.

The alternative apparatus includes a reaction chamber designed to minimize contamination of the walls of the chamber with particles, to increase the production capacity and to make efficient use of resources. To accomplish these objectives, the reaction chamber conforms generally to the shape of an elongated reactant inlet, decreasing the dead volume outside of the molecular stream. Gases can accumulate in the dead volume, increasing the amount of wasted radiation through scattering or absorption by nonreacting molecules. Also, due to reduced gas flow in the dead volume, particles can accumulate in the dead volume causing chamber contamination.

Figures 2, 3:
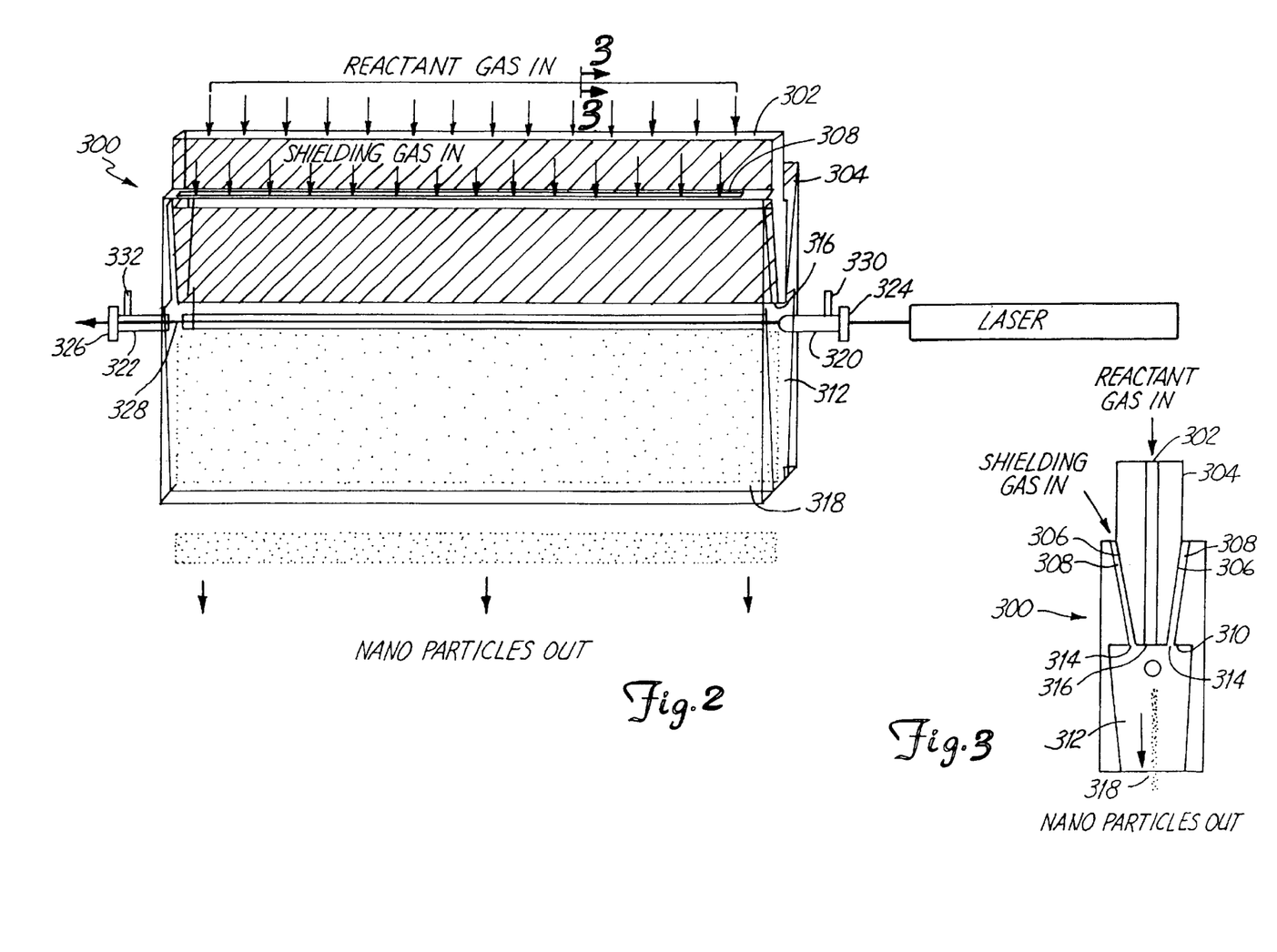
FIG. 2 is a schematic, perspective view of a reaction chamber of an alternative embodiment of the laser pyrolysis apparatus, where the materials of the chamber are depicted as transparent to reveal the interior of the apparatus.
FIG. 3 is a sectional view of the reaction chamber of FIG. 2 taken along line 3—3.

The design of the improved reaction chamber 300 is schematically shown in FIGS. 2 and 3. A reactant gas channel 302 is located within block 304. Facets 306 of block 304 form a portion of conduits 308. Another portion of conduits 308 join at edge 310 with an inner surface of main chamber 312. Conduits 308 terminate at shielding gas inlets 314. Block 304 can be repositioned or replaced, depending on the reaction and desired conditions, to vary the relationship between the elongated reactant inlet 316 and shielding gas inlets 314. The shielding gases from shielding gas inlets 314 form blankets around the molecular stream originating from reactant inlet 316.

The dimensions of elongated reactant inlet 316 preferably are designed for high efficiency particle production. Reasonable dimensions for the reactant inlet for the production of the relevant oxide, sulfide and carbide particles, when used with a 1800 watt $CO_2$ laser, are from about 5 mm to about 1 meter.

Main chamber 312 conforms generally to the shape of elongated reactant inlet 316. Main chamber 312 includes an outlet 318 along the molecular stream for removal of particulate products, any unreacted gases and inert gases. Tubular sections 320, 322 extend from the main chamber 312. Tubular sections 320, 322 hold windows 324, 326 to define a laser beam path 328 through the reaction chamber 300. Tubular sections 320, 322 can include shielding gas inlets 330, 332 for the introduction of shielding gas into tubular sections 320, 322.

The improved apparatus includes a collection system to remove the particles from the molecular stream. The collection system can be designed to collect a large quantity of particles without terminating production or, preferably, to run in continuous production by switching between different particle collectors within the collection system. The collection system can include curved components within the flow path similar to curved portion of the collection system shown in FIG. 1. The configuration of the reactant injection components and the collection system can be reversed such that the particles are collected at the top of the apparatus.

As noted above, properties of the product particles can be modified by further processing. For example, oxide nanoscale particles can be heated in an oven in an oxidizing environment or an inert environment to alter the oxygen content and/or crystal structure of the metal oxide. The processing of metal oxide nanoscale particles in an oven is further discussed in commonly assigned, U.S. patent application Ser. No. 08/1897,903, filed Jul. 21, 1997, now U.S. Pat. No. 5,989,514 entitled "Processing of Vanadium Oxide Particles With Heat," incorporated herein by reference.

In addition, the heating process can be used possibly to remove adsorbed compounds on the particles to increase the quality of the particles. It has been discovered that use of mild conditions, i.e., temperatures well below the melting point of the particles, results in modification of the stoichiometry or crystal structure of metal oxides without significantly sintering the particles into larger particles.

A variety of apparatuses can be used to perform the heat processing. An example of an apparatus 400 to perform this processing is displayed in FIG. 4. Apparatus 400 includes a tube 402 into which the particles are placed. Tube 402 is connected to a reactant gas source 404 and inert gas source 406. Reactant gas, inert gas or a combination thereof to produce the desired atmosphere are placed within tube 402.

Figure 4:
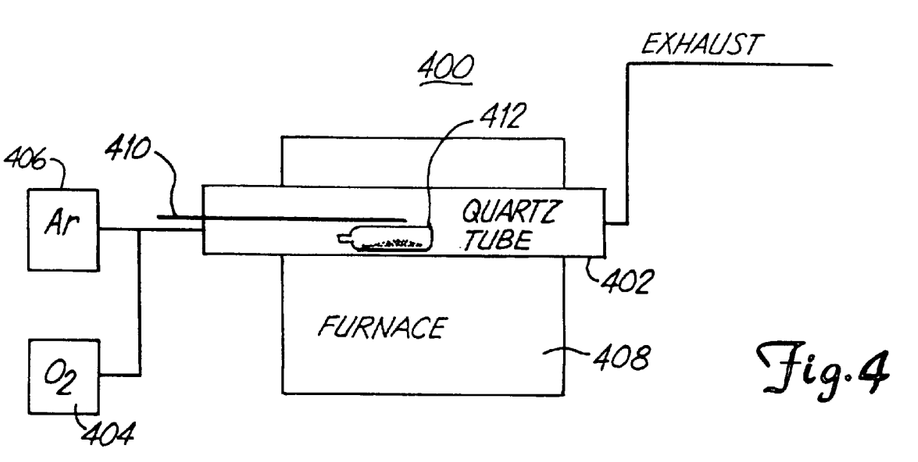
FIG. 4 is a schematic, sectional view of an oven for heating vanadium oxide particles, in which the section is taken through the center of the quartz tube.

Preferably, the desired gases are flowed through tube 402. Appropriate reactant gases to produce an oxidizing environment include, for example, $O_2$, $O_3$, CO, $CO_2$ and combinations thereof. The reactant gas can be diluted with inert gases such as Ar, He and $N_2$. The gases in tube 402 can be exclusively inert gases if an inert atmosphere is desired. The reactant gases may not result in changes to the stoichiometry of the particles being heated.

Tube 402 is located within oven or furnace 408. Oven 408 maintains the relevant portions of the tube at a relatively constant temperature, although the temperature can be varied systematically through the processing step, if desired. Temperature in oven 408 generally is measured with a thermocouple 410. The silicon oxide, silicon carbide, metal oxide, metal sulfide or metal carbide particles can be placed in tube 402 within a vial 412. Vial 412 prevents loss of the particles due to gas flow. Vial 412 generally is oriented with the open end directed toward the direction of the source of the gas flow.

The precise conditions including type of oxidizing gas (if any), concentration of oxidizing gas, pressure or flow rate of gas, temperature and processing time can be selected to produce the desired type of product material. The temperatures generally are mild, i.e., significantly below the melting point of the material. The use of mild conditions avoids interparticle sintering resulting in larger particle sizes. Some controlled sintering of the particles can be performed in oven 408 at somewhat higher temperatures to produce slightly larger average particle diameters.

For the processing of titanium dioxide, for example, the temperatures preferably range from about 50° C. to about 1000° C., and more preferably from about 50° C. to about 500° C. and even more preferably from about 50° C. to about 200° C. The particles preferably are heated for about 1 hour to about 100 hours. Some empirical adjustment may be required to produce the conditions appropriate for yielding a desired material.

B. Particle Properties

A collection of particles of interest generally has an average diameter of less than a micron, preferably from about 5 nm to about 500 nm, more preferably from about 5 nm to about 100 nm, and even more preferably from about 5 nm to about 50 nm. The particles usually have a roughly spherical gross appearance. Upon closer examination, the particles generally have facets corresponding to the underlying crystal lattice. Nevertheless, the particles tend to exhibit growth that is roughly equal in the three physical dimensions to give a gross spherical appearance. Diameter measurements on particles with asymmetries are based on an average of length measurements along the principle axes of the particle. The measurements along the principle axes preferably are each less than about 1 micron for at least about 95 percent of the particles, and more preferably for at least about 98 percent of the particles.

Because of their small size, the particles tend to form loose agglomerates due to van der Waals and other electromagnetic forces between nearby particles. Nevertheless, the nanometer scale of the particles (i.e., primary particles) is clearly observable in transmission electron micrographs of the particles. For crystalline particles, the particle size generally corresponds to the crystal size. The particles generally have a surface area corresponding to particles on a nanometer scale as observed in the micrographs. Furthermore, the particles manifest unique properties due to their small size and large surface area per weight of material. For example, $TiO_2$ nanoparticles generally exhibit altered absorption properties based on their small size, as described in commonly assigned and simultaneously filed U.S. Patent Application, entitled "Ultraviolet Light Block and Photocatalytic Materials," incorporated herein by reference.

As produced, the particles preferably have a high degree of uniformity in size. As determined from examination of transmission electron micrographs, the particles generally have a distribution in sizes such that at least about 95 percent of the particles have a diameter greater than about 40 percent of the average diameter and less than about 160 percent of the average diameter. Preferably, the particles have a distribution of diameters such that at least about 95 percent of the particles have a diameter greater than about 60 percent of the average diameter and less than about 140 percent of the average diameter.

Furthermore, essentially no particles have a diameter greater than about 5 times the average diameter. In other words, the particle size distribution effectively does not have a tail indicative of a small number of particles with significantly larger sizes. This is a result of the small reaction region and corresponding rapid quench of the particles. Preferably, less than about 1 particle in $10^6$ have a diameter greater than about 5 times the average diameter. The narrow size distributions and lack of a tail in the distributions can be exploited in a variety of applications, as described below.

In addition, the particles generally have a very high uniformity with respect to displaying a single crystalline phase and corresponding stoichiometry within the phase. Also, the silicon oxide, silicon carbide, metal oxide, metal sulfide and metal carbide particles produced by the above methods generally have a purity greater than the reactant gases because the crystal formation process tends to exclude contaminants from the lattice. Furthermore, particles produced by laser pyrolysis generally have been found to have a high degree of crystallinity. High degrees of crystallinity can result in harder and/or more abrasion resistant particles, which may be desirable for some applications. In view of all of these characteristics, especially small particle size, uniformity in size, crystalline phase and purity, the particles described herein are particularly suitable for abrasive applications.

Although under certain conditions mixed phase material can be formed, laser pyrolysis generally is effective to produce single phase, crystalline particles with a high degree of uniformity. Primary particles generally consist of single crystals of the material. The single phase, single crystal properties of the particles can be used advantageously along with the uniformity and narrow size distribution. Under certain conditions, amorphous particles are formed by laser pyrolysis. The amorphous particles can be useful for certain applications, and the amorphous particles generally can be heated under mild conditions to form crystalline particles.

The attributes of some of the compositions of particular interest are described. Iron is known to exist in several different oxidation states. For example, iron oxides are known with stoichiometries of $Fe_2O_3$, $Fe_3O_4$ and FeO. FeO has a cubic crystal structure similar to NaCl, and $Fe_3O_4$ has a cubic, inverse spinel crystal structure. $\alpha$-$Fe_2O_3$ has a trigonal crystal structure while $\gamma$-$Fe_2O_3$ has a cubic, spinel crystal structure that transforms to $\alpha$-$Fe_2O_3$ above 600° C. Similarly, iron carbides have been observed with stoichiometries of $Fe_3C$ (cementite-orthorhombic), $Fe_7C_3$ (triclinic and hexagonal, pseudo-hexagonal or orthorhombic), $Fe_5C_2$ (Hagg carbide—monoclinic) $Fe_2C$ (cementite, orthorhombic), $Fe_{20}C_9$, $Fe_4C$ and $\epsilon$-carbide ($Fe_xC$, $2<x<3$, hexagonal). The conditions used in laser pyrolysis generally can be altered to select the desired forms of the iron compounds. The conditions in a particular apparatus for the selective production of $Fe_3C$ and $Fe_7C_3$, have been described in the Bi et al., J. Material Res. article, supra.

Silicon oxides can have stoichiometries of SiO (amorphous) and $SiO_2$. Silicon dioxide can have a variety of crystal structures such as hexagonal (quartz), trigonal, monoclinic (coesite), amorphous and combinations thereof. Silicon carbide similarly can have a variety of crystal structures.

Molybdenum and tungsten also exhibits multiple oxidation states. For example, molybdenum oxides can have stoichiometries of, for example, $MoO_2$ (monoclinic, deformed rutile), $MoO_3$ (triclinic), $Mo_3O_8$ and $Mo_8O_{23}$. Similarly, Molybdenum sulfides can have stoichiometries of, for example, $Mo_2S_3$, $MoS_2$, $MoS_3$ and $Mo_2S_5$. Tungsten oxides can have stoichiometries of, for example, $WO_2$ (tetragonal, deformed rutile), $WO_3$ (orthorhombic), $W_{18}O_{49}$ and $W_{20}O_{58}$. Tungsten carbides are known with stoichiometries of $W_2C$ (hexagonal) and WC (α-tetragonal and β-cubic).

C. Polishing Compositions

A variety of polishing compositions can advantageously incorporate the abrasive particles described above. In its simplest form, the polishing composition can just involve the abrasive particles, produced as described above. More preferably, the abrasive particles are dispersed in an aqueous or nonaqueous solution. The solution generally includes a solvent such as water, alcohol, acetone or the like. The abrasive particles should not be significantly soluble in the solvent. The polishing composition generally includes from about 0.05 percent to about 50 percent, and preferably from about 0.1 percent to about 10 percent by weight abrasive particles.

The solvents preferably have a low level of contaminants. In particular, water used as a solvent should be deionized and/or distilled. Any solvent should be greater than about 99 percent pure, and more preferably at least about 99.9 percent pure. The polishing composition preferably is free from any contaminants, i.e., any composition not included for effectuating the polishing process. In particular, the polishing composition should be free from particulate contaminants, which are not soluble in the solvent.

The polishing compositions can include other components to assist with the polishing process. For example, the polishing composition can include a slurry of colloidal silica. The use of colloidal silica for polishing hard substrates is described in U.S. Pat. No. 5,228,886, incorporated herein by reference. Colloidal silica has been suggested to chemically react with certain surfaces. Silica particles produced by laser pyrolysis are ideally suited for the production of colloidal silica due to all of the properties described above. When using colloidal silica along with additional abrasive particles such as those described above, the polishing composition preferably includes from about 0.05 to about 5 percent abrasive particles and more preferably from about 0.1 to about 2 percent by weight.

The polishing composition can be acidic or basic to improve the polishing characteristics. For polishing metals an acidic pH generally is preferred, for example, in the range from about 3.0 to about 3.5. A variety of acids can be used such as glacial acetic acid. For polishing oxide surfaces a basic polishing composition can be used, for example, with a pH from about 10.5 to about 11.

Preferred abrasive particles include silicon oxide, silicon carbide, metal oxides, metal sulfides and metal carbides with average diameters less than about 100 nm and more preferably from about 5 nm to about 50 nm. Preferred abrasive particles include compounds such as $SiO_2$, SiC, $TiO_2$, $Fe_2O_3$, $Fe_3O_4$, $Fe_3C$, $Fe_7C_3$, $MoS_2$, $MoO_2$, WC, $WO_3$, and $WS_2$. Also, preferred abrasive particles have a relatively narrow diameter distribution and an effective cut of particle diameters that are several times larger than the average diameter, as described above. The particular composition of abrasive particles should be selected such that the particles have an appropriate hardness for the surface to be polished as well as an appropriate distribution of diameters to obtain efficiently the desired smoothness. Abrasive particles that are too hard can result in undesired scratches in the surface while particles that are too soft may not be suitably abrasive.

The composition of the abrasive particles should also provide for removal of the polishing compositions after completion of the polishing. One,approach to cleaning polished surfaces involves dissolving the abrasive particles with a cleaning solution that does not damage the polished surface.

The polishing compositions can be used for mechanical or mechanochemical polishing that is performed manually or using a powered polishing machine. In either case, the polishing composition is generally applied to a polishing pad or cloth to perform the polishing. Any of a variety of mechanical polishers can be used, for example, vibratory polishers and rotary polishers.

The polishing compositions are particularly useful for the polishing of substrate surfaces for the production of integrated circuits. As the density of integrated circuits on a single surface increases, the tolerances for smoothness of the corresponding substrates become more stringent. Therefore, it is important that polishing process is able to remove small surface discontinuities prior to applying circuit patterns onto the substrate. The small size and uniformity of the abrasive particles disclosed herein are particularly suitable in polishing compositions for these applications. $SiO_2$ particles are suitable for the polishing of silicon based semiconductor substrates. Similarly, layered structures involving patterned portions of insulating layers and conducting layers can be simultaneously planarized, as described in U.S. Pat. No. 4,956,313, incorporated herein by reference.

The embodiments described above are intended to be representative and not limiting. Additional embodiments of the invention are within the claims. As will be understood by those skilled in the art, many changes in the methods and apparatus described above may be made by the skilled practitioner without departing from the spirit and scope of the invention, which should be limited only as set forward in the claims which follow.

What is claimed is:

1. A method of producing $SiO_2$ particles comprising reacting a molecular stream comprising a silicon compound precursor, an oxygen source distinct from the silicon compound precursor and a radiation absorbing gas in a reaction chamber where the reaction is driven by heat absorbed from a radiation beam.

2. The method of claim 1 wherein the silicon compound precursor comprises $CH_3SiCl_3$.

3. The method of claim 1 wherein the radiation beam is supplied by a $CO_2$ laser.

4. The method of claim 1, wherein the molecular stream is generated by a nozzle elongated in one dimension.

5. The method of claim 1 wherein the radiation beam is supplied by a laser.

6. The method of claim 1 wherein the radiation beam is supplied by an arc lamp.

7. The method of claim 1 wherein the oxygen source comprises $O_2$.

8. The method of claim 1 wherein the radiation absorbing gas comprises $C_2H_4$.

9. The method of claim 1 further comprising collecting the particles on a filter.

10. The method of claim 1 wherein the reaction chamber pressure is from about 80 Torr to about 500 Torr.

11. The method of claim 1 wherein the particles have an average diameter less than about 500 nm.

12. The method of claim 1 wherein the particles have an average diameter from about 5 nm to about 200 nm.

13. The method of claim 1 wherein the particles have a distribution of sizes with at least about 95 percent of the particles having a diameter greater than about 40 percent of the average diameter and less than about 160 percent of the average diameter.

14. The method of claim 1 wherein the particles have a distribution of sizes with at least about 95 percent of the particles having a diameter greater than about 60 percent of the average diameter and less than about 140 percent of the average diameter.

15. The method of claim 1 wherein essentially no particles have a diameter greater than about 5 times the average diameter.

16. The method of claim 1 wherein the particles comprise amorphous particles.

17. The method of claim 1 wherein the particles comprise crystalline particles.

18. A method of producing $SiO_2$ particles comprising reacting a molecular stream comprising a silicon compound precursor, an oxygen source and a radiation absorbing gas in a reaction chamber, where the reaction is driven by heat absorbed from a light beam, wherein the particles have an average diameter less than about 500 nm.

19. The method of claim 18 wherein the particles have an average diameter from about 5 nm to about 200 nm.

20. The method of claim 18 wherein essentially no particles have a diameter greater than about 5 times the average diameter.

* * * * *